Figure 1:
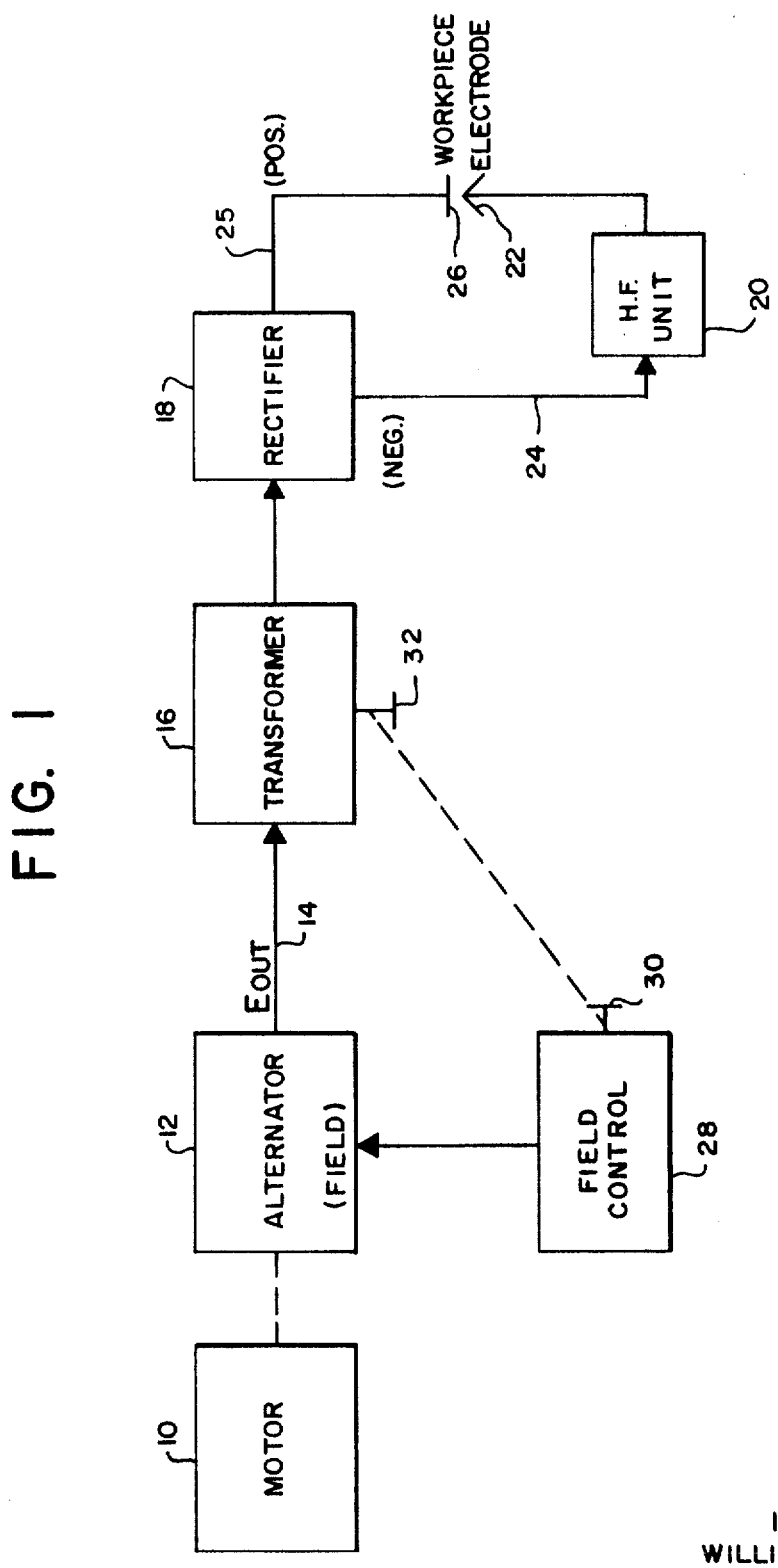

United States Patent

[11] 3,593,121

| [72] | Inventor | William A. Jones |
| | | 45 Lyman Road, Brookline, Mass. 02186 |
| [21] | Appl. No. | 820,445 |
| [22] | Filed | Apr. 30, 1969 |
| [45] | Patented | July 13, 1971 |

[54] POWER SUPPLY ALTERNATOR HAVING FIELD CURRENT CONTROL AND A VARIABLE TRANSFORMER CONNECTED ACROSS THE OUTPUT
6 Claims, 2 Drawing Figs.

[52] U.S. Cl. .................................................. 322/73,
219/133, 322/80, 322/95, 323/45
[51] Int. Cl. .................................................. H02p 9/30
[50] Field of Search ........................................ 322/59, 73,
80, 89, 95, 96; 323/45, 47; 219/133, 114, 116

[56] References Cited
UNITED STATES PATENTS

| 3,287,624 | 11/1966 | Perry | 323/47 X |
| 3,453,527 | 7/1969 | Nolan | 322/73 X |
| 3,457,492 | 7/1969 | Rabanit | 322/96 |

Primary Examiner—Oris L. Rader
Assistant Examiner—H. Huberfeld
Attorney—Darby & Darby ABSTRACT: A power supply for use with a tungsten inert gas or plasma-type arc-welding machine comprises an alternator, a variable transformer connected to the alternator output, and control means for adjusting the field strength of the alternator to regulate the current output to the welding apparatus. The control means determines the transformation ratio of the transformer for the purpose of maintaining the open circuit voltage at the transformer output terminals at a preselected level which will provide optimum arc striking regardless of the selected welding current. The field control means may also include a variable exponential decay circuit to adjust the current flow in the alternator at the end of a welding cycle.

INVENTOR
WILLIAM A. JONES

BY Darby & Darby

ATTORNEYS

POWER SUPPLY ALTERNATOR HAVING FIELD CURRENT CONTROL AND A VARIABLE TRANSFORMER CONNECTED ACROSS THE OUTPUT

This invention relates to regulated power supplies. More particularly, this invention relates to a welding machine power supply capable of producing an open circuit voltage which is fixed between narrow prescribed limits over a wide range of load currents, such a power supply having particular utility with tungsten inert gas welding machines.

In tungsten inert gas welding, a stream of inert gas is caused to surround the weld area and a tungsten electrode. A high voltage spark between the electrode and workpiece ionizes a small portion of the gas causing the ionized gas atoms to be attracted to the negatively charged electrode. The high-velocity impact between the ionized atoms and electrode produces a high temperature at the electrode which results in the emission of electrons from the electrode to the workpiece. The electrons raise the temperature of the shielding gas because of their collision with the ionized gas atoms resulting in the creation of a plasma zone, the temperature of which exceeds 8,000° F.

For well-known reasons, it is highly desirable that the charging voltage applied across the electrode and workpiece be maintained within a narrow range (e.g., in the order of 75 to 90 volts) to ensure optimum arc striking. For practical purposes, this requirement may prevail over a wide range of arc currents (e.g., 0.5 amps to 50 or 120 amps) which may be selectable by the user for reasons which are not germaine to this invention. The power supply according to this invention fulfills both of these requirements in an economical and efficient manner. Additionally, the power supply of the invention may include a simplified means for controlling the finishing time of a weld cycle. This prevents unsightly welds due to excess pooling which might otherwise occur when the weld is terminated.

Briefly, in accordance with the invention, a power supply comprises an alternator adapted to produce an alternating output voltage, a variable transformer for coupling this output voltage to a rectifier, and control means for adjusting the current flow in the field winding of the alternator. The electrode-charging voltage is derived from the rectifier, and the magnitude of the current flow across the arc between the electrode and workpiece is dependent upon the current flow in the alternator field winding. The control means for the field winding is also effective to vary the voltage output from the variable transformer to effectively provide a constant voltage, variable impedance source for the arc, which source has the desired characteristics indicated above. Additionally, the alternator field strength may be caused to decay at a variable exponential rate by the control means to provide an adjustable finish at the end of a weld cycle.

Figure 2:
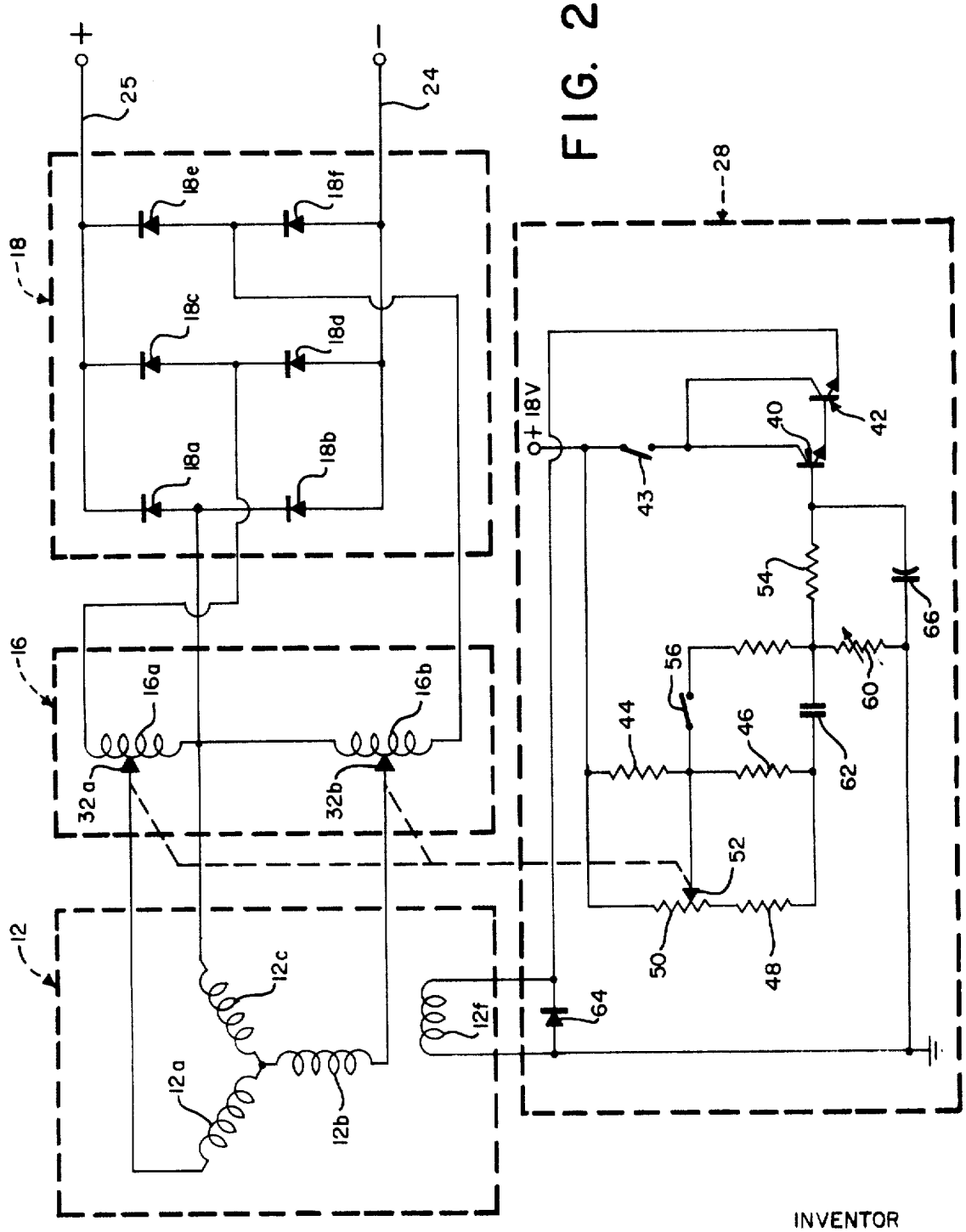

The invention is described in further detail below with reference to the accompanying drawings, wherein:

FIG. 1 is a block diagram of a welding machine incorporating the power supply according to the invention; and FIG. 2 is a schematic diagram illustrating the circuit of a preferred embodiment of the invention.

In FIG. 1 a motor 10 is shown driving the rotatable field of a standard three-phase alternator 12. The three-phase output voltage from the armature of alternator 12 is applied via line 14 to a transformer 16 which couples the alternator output to a full full-wave 18. A conventional high frequency high voltage source 20 is connected in series between the tungsten electrode 22 and the negative line 24 from the rectifier 18. The workpiece 26 is electrically connected to the positive line 26 from rectifier 18.

For various reasons it is necessary to control accurately the current flow in the arc between electrode 22 and workpiece 26. Typically, it may be necessary to provide a hundredfold (or greater) difference between the extremes of available current level (e.g., from 0.5 amps to 50 amps) for different welding applications. The means for controlling the current flow across the arc comprises a field control unit 28 which adjusts the current flow in the field winding of the alternator to thereby determine its output current. The means for adjusting control unit 28 is shown diagrammatically as the element 30.

The current in the field of alternator 12 must be varied over a wide range to provide a hundredfold change in alternator output current. This substantial change in the alternator field strength will also cause a sizable change in the open circuit output voltage from the alternator. For example, the open circuit output voltage may decrease from 90 volts to 9 volts in order to provide a decrease in output current from 50 amps to 0.5 amps. As noted above, this substantial change in the open circuit output voltage extends beyond that range (typically, 75 to 90 volts) which ensures optimum arc striking.

To overcome this drawback, the adjustment means 30 of the alternator field control 28 is coupled to a voltage adjustment means 32 of transformer 16 to cause the transformation ratio of the transformer to be varied inversely relative to the alternator field strength. In this way the open circuit output voltage at the terminals of transformer 16 can be maintained within the range required for optimum arc striking. The effect is to convert the alternator from a variable voltage, variable impedance source (the effective internal resistance of the alternator comprising the impedance) to a constant voltage, variable impedance source, with the impedance varying over a much wider range (e.g., 100 to 1 as opposed to 10 to 1). In this respect, the combination of alternator 12 and transformer 16, as shown in FIG. 1, may be considered equivalent to a battery and large variable resistance in series, without, however, the substantial power dissipation encountered when resistive circuit elements are used. Once the arc has fired, the voltage across it remains substantially constant during the welding cycle at a relatively low value in the order of 10 volts.

FIG. 2 is a schematic diagram of a preferred embodiment of the invention wherein, to the extent feasible, the numerals of FIG. 1 are used to identify corresponding circuit elements.

The alternator armature is shown wound as a star consisting of windings 12a, 12b and 12c. The field winding is shown at 12f. Transformer 16 comprises two autotransformers 16a and 16b showing respective movable taps 32a and 32b which are ganged together as diagrammatically illustrated. The junction of windings 16a and 16b is connected to alternator armature coil 12c, coils 12a and 12b being connected to taps 32a and 32b, respectively in an open delta system. As taps 32a and 32b are moved, the transformation ratios of the autotransformers are changed accordingly in a well-known manner.

Rectifier 18 is a standard three-phase bridge rectifier and includes six diodes 18a, b, c, d, e, f connected as shown to the three output terminals of transformers 16a and 16b producing positive and negative voltages on the lines 2⁻ and 2⁴, respectively.

The field control 28 includes cascaded transistor amplifiers 40 and 42, the collectors of which are connected to a positive bus (e.g. at 18 volts). The emitter of transistor 42 is connected to one side of the alternator field winding 12f, and its collector (which is connected to the collector of transistor 40) connected to the current adjusting circuit 30 through a normally open start switch 43.

The current-adjusting circuit 30 comprises a resistive warping network including resistors 44, 46, and 48 and potentiometer 50 having an adjustable tap 52 connected to the junction of resistors 44 and 46. The base of transistor 40 is coupled through a low resistance 54 and a timer switch 56 (which controls the duration of a weld cycle) to this junction so that when switches 43 and 56 are closed, the warping network 30 controls the conduction of transistor 40 which, in turn, determines the current flow through transistor 42. Since this current also flows in the field winding 12f, its magnitude determines the available load current and the alternator open circuit voltage as discussed above.

The function of the resistive warping network is to maintain a linear relationship between the dial position of potentiometer tap 52 (indicated on the console of the equipment) and the actual load current provided by the power supply. This is desirable since the relationship of alternator field strength and load current is not linear and because of nonlinearities introduced by the variable autotransformers 16a and 16b and possibly other circuit components. The values of resistors 44, 46 and 48 and potentiometer 50 may be determined empirically depending on the specific elements and components used in any particular practical situation. As one specific example, resistors 44, 46 and 48 may be, respectively, 100, 1,500 and 300 ohms. Potentiometer 50 may have a maximum resistance of 1,000 ohms. Resistor 54 may be 100 ohms.

At the end of a weld cycle, it is desirable that the field strength be permitted to decay at a variable and gradual rate to avoid unsightly and, possibly, improper welds. For this purpose, according to another feature of the invention, a variable RC circuit comprising potentiometer 60 and capacitor 62 is connected between ground and the input to transistor 40. During the welding cycle (with switches 43 and 56 closed), capacitor 62 charges to the voltage at the junction of resistors 44 and 46 (i.e. the input voltage to transistor 40). When switch 56 opens at the end of a weld cycle, conduction of transistor 40 (and transistor 42) is maintained temporarily by the discharge of capacitor 62 through potentiometer 60. Thus, by controlling the resistance of potentiometer 60 is is possible to vary the length of time during which transistors 40 and 42 conduct upon termination of a weld cycle. The variable exponential decay of the transistor input voltage will also produce a similar decay of the alternator field, as desired.

The remaining illustrated components, namely, diode 64 and capacitor 66 are inserted in the circuit as protective devices to bypass to ground excessive transient voltages which may occur upon termination of an inductive load.

Various portions of the welding machine (e.g. timing circuits and motor controls) have not been illustrated in FIG. 1 and/or FIG. 2 because they are deemed immaterial to the present invention. The invention is intended primarily for use with tungsten inert gas welding and plasma-welding machines, but it may be used in other devices where the characteristic of a generally constant voltage over a wide range of load currents is desired. Certain aspects of the invention may even have utility outside of the welding arts in general.

What I claim is:

1. A power supply for providing a no-load voltage within a preselected range for a predetermined range of load currents, comprising,
   an alternator having armature and field windings with the no-load voltage across said armature windings and the load current provided thereby being dependent upon the flowing in said field windings,
   transformer means coupled across said armature windings, said transformer means including means for varying the transformation ratio of said transformer,
   field strength control means for controlling the current flow in said field windings, and
   means connecting said field strength control means to said transformer-varying means for varying said transformation ratio as a function of the alternator field strength to maintain said no-load voltage within said preselected range for any selected load current within said predetermined range.

2. A power supply according to claim 1, wherein
   said transformer-varying means includes movable means for varying the turns ratio of said transformer,
   said field strength control means includes a variable impedance including an adjustable tap, and
   said connecting means comprises means mechanically coupling said movable means and adjustable tap.

3. A power supply according to claim 1, wherein said transformer means includes at least one autotransformer.

4. A power supply according to claim 2, further including an impedance network connected in circuit with said variable impedance for determining the relationship between the position of said adjustable tap and the full load output current provided by the power supply.

5. An arc welder power supply for use with plasma-type welding machines and adapted to provide a no-load voltage within a preselected range for a predetermined range of arc currents comprising
   an alternator having armature and field windings with the no-load voltage across said armature windings and the arc current provided thereby being dependent upon the current flowing in said filed windings,
   autotransformer means coupled across said armature windings, said autotransformer means including a variable tap for varying the transformation ratio of said autotransformer,
   field strength control means including an adjustable potentiometer and amplifier for controlling the current flow in said field windings,
   means connecting the tap of said potentiometer to said autotransformer tap for varying said transformation ratio as a function of the alternator field strength to maintain said no-load voltage within said preselected range for any selected arc current within said predetermined range.

6. An arc welder power supply according to claim 5 wherein said field control means includes a variable RC circuit for controlling the decay time of the current in said field winding when said amplifier is disconnected therefrom.